(12) United States Patent
Foster et al.

(10) Patent No.: US 9,815,490 B2
(45) Date of Patent: Nov. 14, 2017

(54) TRACKLESS DARK RIDE VEHICLE, SYSTEM, AND METHOD

(71) Applicant: Oceaneering International, Inc., Houston, TX (US)

(72) Inventors: Samuel T Foster, Perry Hall, MD (US); Michael Wayne Boshears, Orlando, FL (US); Andrew Grant, Ocoee, FL (US); Frank Peter Hass, Windmere, FL (US); Clifford Allen Jennings, Highland, MD (US); Eric Arthur King, Westminster, MD (US); Kenneth Thomas Kroslowitz, Edgewater, FL (US); Suhas Subhaschandra Malghan, Baltimore, MD (US); Stephen A Sywak, Glen Burnie, MD (US)

(73) Assignee: OCEANEERING INTERNATIONAL, INC., Houston, TX (US)

( * ) Notice: Subject to any disclaimer, the term of this patent is extended or adjusted under 35 U.S.C. 154(b) by 9 days.

(21) Appl. No.: 14/821,649

(22) Filed: Aug. 7, 2015

(65) Prior Publication Data
US 2015/0343317 A1 Dec. 3, 2015

Related U.S. Application Data

(63) Continuation of application No. 13/470,244, filed on May 11, 2012, now abandoned.

(51) Int. Cl.
*B62D 5/04* (2006.01)
*B62D 3/02* (2006.01)
(Continued)

(52) U.S. Cl.
CPC ............. *B62D 5/04* (2013.01); *A63G 21/08* (2013.01); *A63G 25/00* (2013.01); *A63G 31/08* (2013.01);
(Continued)

(58) Field of Classification Search
CPC ... G09B 9/02; G09B 9/04; G09B 9/12; A63G 31/16; A63G 21/08; A63G 7/00; F16M 11/126; F16M 11/18; F16M 2200/048
See application file for complete search history.

(56) References Cited

U.S. PATENT DOCUMENTS 3,577,659 A * 5/1971 Kail .................... B25J 17/0216
248/163.1
5,346,045 A * 9/1994 Bennett .................. F16H 25/20
192/141

(Continued)

*Primary Examiner* — Thomas Ingram
(74) *Attorney, Agent, or Firm* — Maze IP Law, PC

(57) ABSTRACT

A motion assembly that produces pitch and roll motions includes lower and upper plates. A pivotable coupling having upper and lower shafts extending from its center is coupled between the upper and lower plates. At least two linear actuators are coupled between the plates. Extension and retraction of the actuators pivots the upper plate about the pivotable coupling relative to the lower plate. A vehicle includes two steerable propulsion wheels coupled to a chassis. A lower plate of a pitch and roll assembly, similar to that just described, couples to the chassis via a slew bearing. Seating is coupled to the upper plate. The seating rotates with respect to the chassis via controlled rotation of the slew bearing with reference to the chassis. The seating can be rotated to point in any direction with respect to the chassis regardless of the direction the steerable propulsion wheels move the chassis.

19 Claims, 11 Drawing Sheets

(51) Int. Cl.
- *G09B 9/12* (2006.01)
- *A63G 31/08* (2006.01)
- *G09B 9/02* (2006.01)
- *F16M 11/18* (2006.01)
- *G09B 9/04* (2006.01)
- *A63G 7/00* (2006.01)
- *A63G 21/08* (2006.01)
- *A63G 31/16* (2006.01)
- *F16M 11/12* (2006.01)
- *B62D 3/00* (2006.01)
- *B62D 7/06* (2006.01)
- *A63G 25/00* (2006.01)
- *F16H 21/54* (2006.01)

(52) U.S. Cl.
CPC ............... *A63G 31/16* (2013.01); *B62D 3/00* (2013.01); *B62D 3/02* (2013.01); *B62D 5/0421* (2013.01); *B62D 7/06* (2013.01); *F16H 21/54* (2013.01); *G09B 9/02* (2013.01); *G09B 9/04* (2013.01); *G09B 9/12* (2013.01); *A63G 7/00* (2013.01); *F16M 11/126* (2013.01); *F16M 11/18* (2013.01); *F16M 2200/048* (2013.01); *Y10T 74/18888* (2015.01)

(56) References Cited

U.S. PATENT DOCUMENTS

| | | | | |
|---|---|---|---|---|
| 5,473,990 | A * | 12/1995 | Anderson | A63G 31/16 104/154 |
| 5,623,878 | A * | 4/1997 | Baxter | A63G 1/30 104/154 |
| 7,604,215 | B1 * | 10/2009 | Miller | G09B 9/12 248/371 |
| 7,739,005 | B1 * | 6/2010 | Tang | B60L 3/10 701/22 |
| 2005/0048446 | A1 * | 3/2005 | Fromyer | A63G 31/12 434/29 |
| 2006/0076745 | A1 * | 4/2006 | Gordon | F16M 11/42 280/79.11 |
| 2006/0222539 | A1 * | 10/2006 | Hetherington | G09B 9/02 417/477.1 |
| 2006/0237242 | A1 * | 10/2006 | Burke | B60K 6/32 180/23 |
| 2007/0117068 | A1 * | 5/2007 | Nelms | G09B 9/02 434/29 |
| 2008/0189003 | A1 * | 8/2008 | Gillula | G05D 1/0212 701/24 |
| 2010/0300796 | A1 * | 12/2010 | Ryan | B60K 26/00 180/329 |

* cited by examiner

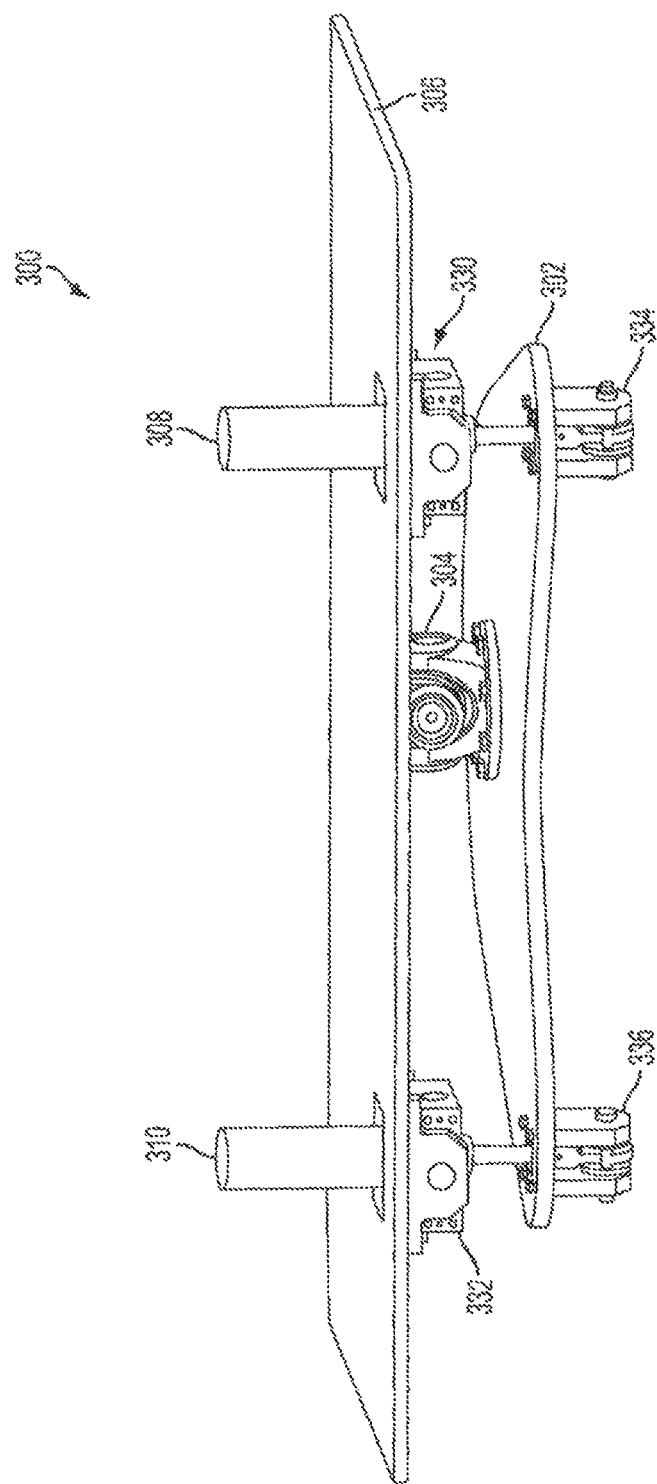

TRACKLESS DARK RIDE VEHICLE, SYSTEM, AND METHOD

RELATION TO PRIOR APPLICATIONS

This application is a continuation of pending U.S. Non-Provisional application Ser. No. 13/470,244 filed on May 11, 2012 and claims priority through U.S. Provisional Application No. 61/484,942, filed on May 11, 2011.

FIELD OF THE INVENTION

The disclosed invention is directed to multi-passenger vehicles used in amusement park rides. More specifically, the vehicle is battery operated and includes features permitting passengers to experience motion with three degrees of freedom (yaw, pitch, and roll) while simultaneously being propelled along a preprogrammed route, which is autonomously traveled by the vehicle without use of a mechanical track or wire stretched along the route.

BACKGROUND OF THE INVENTION

Vehicles for amusement park rides have existed for a long time. Earliest vehicles rode on tracks. These vehicles were loud, due to the metal-on-metal sound of wheels on tracks. Rides making use of these vehicles were not amenable to changes, because of the difficulty of removing, reconfiguring, and reinstalling the tracks. Additionally, these vehicles were not selfpowered. Each vehicle, or a string of vehicles, may have been coupled to a rope, chain, or cable that ran in a continuous loop throughout the ride. The movement of the rope, chain, or cable also caused undesirable noise. Moreover, the mere existence of the rope, chain, or cable posed a physical threat (due to tripping or entanglement) to any person departing the safety of the ride vehicle and to the amusement ride operators themselves.

An innovation applied to the earliest vehicles came in the form of an on-board electric motor that was powered by an off-board power supply. To transfer electrical power to the electric motor, vehicles running on tracks made use of a "third rail" that ran between or to the side of the tracks typically at a predetermined fixed distance from the track. Conductive metal brushes or shoes protruding from the vehicle made contact with the third rail. Electrical power typically ran from the third rail to the electric motor of the vehicle via the brushes or shoes and was returned to ground via the vehicle's metal wheel making contact with the grounded metal track of the ride. Electrical vehicles of this type presented the serious danger of electrocution of a patron if the patron left the ride vehicle and stumbled on an electrified third-rail. Additionally, electrical vehicles of this type were still bound to a track and all of the problems related thereto.

Not all electric ride vehicles are bound to tracks. Vehicles such as "bumper cars,"which are steered by the passenger, typically obtained electrical power via a brush or solid conductor scraping across an electrified grid positioned above the ride. Electrical current was returned to ground via similar contacts or metal rollers directly to the solid metal floor of the ride. Electrical vehicles of this type also present the serious danger of electrocution of a patron if the patron made contact with an improperly insulated pole (supporting the contact scraping the electrified grid above the ride) and ground at the same time. These vehicles moreover typically presented the problem of a lack of safety features that could disable one or all of the vehicles in the ride if a patron was to leave a vehicle during the ride. Similar lack of safety features were present in electrified vehicles running on tracks.

Innovations relating to the powering of vehicles freed some vehicles from tracks. For example, Disney Enterprises, Inc. introduced a battery-powered ride vehicle in 1982 at its "Universe of Energy" pavilion at EPCOT® theme park. The World According to Jack, http://land.allears.net/blogs/jack-spence/20 1 Oil O/universe_oLenergy 1.html (last visited May 8, 2012). In this ride, patrons "were transported through the pavilion in large battery-powered 'traveling theatre cars' that followed guide-wires embedded in the floor as opposed to riding along conventional ride tracks." Wikipedia, http://en.wikipedia.org/wiki/Universe_oLEnergy (last visited Apr. 17, 2012). This type of ride presents two problems in the field of ride vehicles.

First, the locomotion of large battery-operated vehicles consumes a great deal of energy. Storage of a large amount of energy requires many rechargeable-type batteries. For the Universe of Energy vehicles, "each vehicle carries eight automotive batteries. Of course, these batteries need to be recharged frequently so within the attraction's two turntables are 'charging plates' that contain electromagnets. The magnets work in conjunction with onboard magnets that create an electric current that is transferred to the vehicle's batteries." The World According to Jack, supra. It is believed that the ratio of the amount of time this type of vehicle spends on its charging station (e.g., turntable) vs. the amount of time the vehicle spends moving under its own power, is greater than one. Accordingly, the vehicle's batteries are slowly being charged for long periods relative to the time when the vehicle is in motion.

Second, vehicles that use guide-wires embedded in a floor, similar to vehicles that ride on tracks, are not amenable to changes in the configuration of the vehicle's path of travel, because of the difficulty of removing, reconfiguring, and reinstalling the wires. Moreover, just like tracks, a vehicle following a guide wire must stay on the guide wire, therefore, it must eventually return to the point from which it began its journey and cannot easily, if at all, follow a path that crosses over itself.

Still other problems confront designers of modern amusement rides. Patrons are no longer satisfied with simply moving through a ride while being maintained in one plane of travel. Patrons may wish to experience yaw (i.e., rotation in the x-y plane), pitch (i.e., climb and dive), roll (pitching left and right), and heave (vertical motion along the z-axis). Motion assemblies exist that provide these four degrees of motion to ride patrons; however, due to the very large consumption of power (necessitated by moving a platform that supports the weight of a given number of patrons through space in these directions), known four degree of freedom motion assemblies are coupled to fixed supplies of electrical power. This limits the mounting of prior art motion assemblies either to fixed locations or to mounts on tracks that use a "third rail"type of electrical connection to supply power to the motion assembly. The former situation is problematic at least because patrons are usually confined to a single room (which may move in yaw, roll, pitch, and heave) while images are projected on the walls within the room. The latter situation is problematic at least because patrons face all the same issues faced by patrons of older ride vehicles that were confined to riding on tracks; additionally there is the danger of electrocution if a patron was to leave the ride vehicle and stumble on the electrified third-rail.

Still other problems exist with respect to the motions of prior art vehicles. For example, there are no known prior art vehicles that can "crab," that is, move in a linearly diagonal direction at a given angle, for example 45° while the vehicle faces forward at 0°. Additionally, known prior art vehicles do not typically cross over their own paths or operate simultaneously with other vehicles while following paths that interweave the vehicles. The ability to interweave the paths of multiple simultaneously operating ride vehicles is desirable in 3 situations where ride designers want to mimic the seemingly random patterns made by a moving school of fish, a swooping flock of sparrows, or a running herd of wild animals.

The recharging of battery operated vehicles is also problematic. Designers of battery operated vehicles might base the battery capacity on the expected amount of charge needed to be stored to move a fully loaded vehicle through a show from start to finish, for a given number of shows per day; this amount of charge might be called the maximum charge value. During the course of the show(s), the charge would be drained from the battery. A typical battery might be cycled from 100% of its maximum charge value down to 10% of its maximum charge value; because a typical design would extract all of the charge possible from the battery before recharging the battery. Once the battery was depleted (e.g., to the 10% level), the battery would be connected to a charging system that would slowly charge the battery from its depleted level back to the maximum charge value for the next show. Rapid charging was not possible, as batteries would overheat if too much charge were pushed into them too quickly. Therefore, once a vehicle's charge was depleted it would be taken out of service for recharging. An out of service vehicle would need to be replaced by an extra vehicle.

What is needed is a ride vehicle that is self-powered, can find its way through an amusement by dead-reckoning, is mechanically designed and electrically managed to be efficient in its use of energy, is not restricted to draw energy from a track or follow a track or wire, can be programmed to travel in a seemingly random pattern while crossing over the paths of other vehicles operating simultaneously in close proximity, permits independent rotation of an upper passenger platform with respect to a lower steering and propulsion platform, where the upper platform moves in pitch and roll and the rotates with respect to the lower platform to move in yaw, and is not required to be removed from service, or sit in one location for a long period of time relative to the time it is in motion, to recharge its batteries.

BRIEF SUMMARY OF THE INVENTION

The disclosed invention obviates the aforementioned inconveniencies and deficiencies of conventional systems and schemes associated with vehicles for rides in amusement parks. In accordance with an embodiment of the invention, a motion assembly configured to produce pitch and roll motions may include a lower reaction plate oriented in a horizontal plane, an upper reaction plate spaced apart from the lower reaction plate, a pivotable coupling having an upper shaft and a lower shaft extending away from a center of the pivotable coupling and terminating at respective upper and lower shaft ends, the upper shaft end coupled to the upper reaction plate and the lower shaft end coupled to the lower reaction plate, and when the pivotable coupling is oriented vertically its central axis is perpendicular to the horizontal plane, and at least two linear actuators spaced apart from each other and from the pivotable coupling, and coupled at respective upper ends to the upper reaction plate and at respective lower ends to the lower reaction plate, and configured to extend and retract to pivot the upper reaction plate about the pivotable coupling to produce pitch and roll motions of the upper reaction plate relative to the lower reaction plate.

In accordance with another embodiment of the invention a vehicle may include a first steerable propulsion wheel coupled to the chassis and configured to rotate a first wheel to a first commanded direction and rotate the first wheel at a first commanded speed, a second steerable propulsion wheel coupled to the chassis and configured to rotate a second wheel to a second commanded direction and rotate the second wheel at a second commanded speed, a lower reaction plate coupled to the chassis, an upper reaction plate spaced apart from the lower reaction plate, a pivotable coupling having an upper shaft and a lower shaft extending away from a center of the pivotable coupling and terminating at respective upper and lower shaft ends, the upper shaft end fixed to the upper reaction plate and the lower shaft end fixed to the lower reaction plate, and at least two linear actuators spaced apart from each other and from the pivotable coupling and coupled at respective upper ends to the upper reaction plate and at respective lower ends to the lower reaction plate, and configured to extend and retract to pivot the upper reaction plate about the pivotable coupling to produce pitch and roll motions of the upper reaction plate relative to the lower reaction plate.

The vehicle may further include a slew bearing fixed to the chassis and having a slew bearing gear rotatable with respect to the chassis, a slew bearing pinion motor having a shaft, the slew bearing pinion motor fixed to the chassis, a slew bearing pinion fixed to the shaft, the pinion engaging the slew bearing gear and configured to rotate at a commanded slew speed and direction, wherein the lower reaction plate is coupled to the chassis via the slew bearing by fixing the lower reaction plate to the slew bearing, wherein the lower reaction plate rotates with the slew bearing and produces a yaw motion of the upper reaction plate with respect to the chassis.

In accordance with another embodiment of the invention, a vehicle may include a controller, a memory operationally coupled to the controller, a communication interface operationally coupled to the controller and configured to communicate with a ride system controller that is remote to the vehicle, a chassis, a battery configured as a sole source of operating energy of the vehicle, first and second independently controlled steerable propulsion wheels fixed to the chassis and configured to propel and steer the vehicle according to commands issued by the controller, a lower reaction plate coupled to the chassis, an upper reaction plate spaced apart from the lower reaction plate, a pivotable coupling having an upper shaft and a lower shaft extending away from a center of the pivotable coupling and terminating at respective upper and lower shaft ends, the upper shaft end fixed to the upper reaction plate and the lower shaft end fixed to the lower reaction plate, and at least two linear actuators spaced apart from each other and from the pivotable coupling, and coupled at respective upper ends to the upper reaction plate and at respective lower ends to the lower reaction plate, and configured to extend and retract to pivot the upper reaction plate about the pivotable coupling to produce pitch and roll motions of the upper reaction plate relative to the lower reaction plate.

In accordance with still another embodiment of the invention, a vehicle may include a chassis, a first propulsion wheel coupled to the chassis, a second propulsion wheel coupled to the chassis and spaced apart from the first propulsion wheel, a slew bearing having a first side fixed to the chassis and a second side comprising a slew bearing gear rotatable with respect to the chassis, a motor configured to rotate the slew bearing gear, a platform coupled to the second side of the slew bearing, wherein the platform rotates with respect to the chassis by action of the motor, and seating coupled to the platform, the seating having a front side and a back side, opposite to the front side, where the seating front side can be rotated to point in any direction with respect to the chassis by operation of the motor regardless of any direction of travel of the chassis.

BRIEF DESCRIPTION OF THE DRAWINGS

Several figures are provided herein to further the explanation of the disclosed invention. More specifically:

FIGS. 7A and 7B are front-lower and rear-upper isometric views of a motion assembly, in accordance with an embodiment of the invention.

DETAILED DESCRIPTION

It is to be understood that both the foregoing general description and the following detailed description are exemplary. As such, the descriptions herein are not intended to limit the scope of the disclosed invention. Instead, the scope of the disclosed invention is governed by the scope of the appended claims.

The ride vehicle described herein may be comprised of three assemblies: the transport assembly, the motion assembly, and the passenger assembly. The motion assembly mounts on top of the transport assembly. The passenger assembly mounts on top of the motion assemblies. The invention is not limited to this configuration. Each of the three assemblies will be described in order below.

Figure 1:
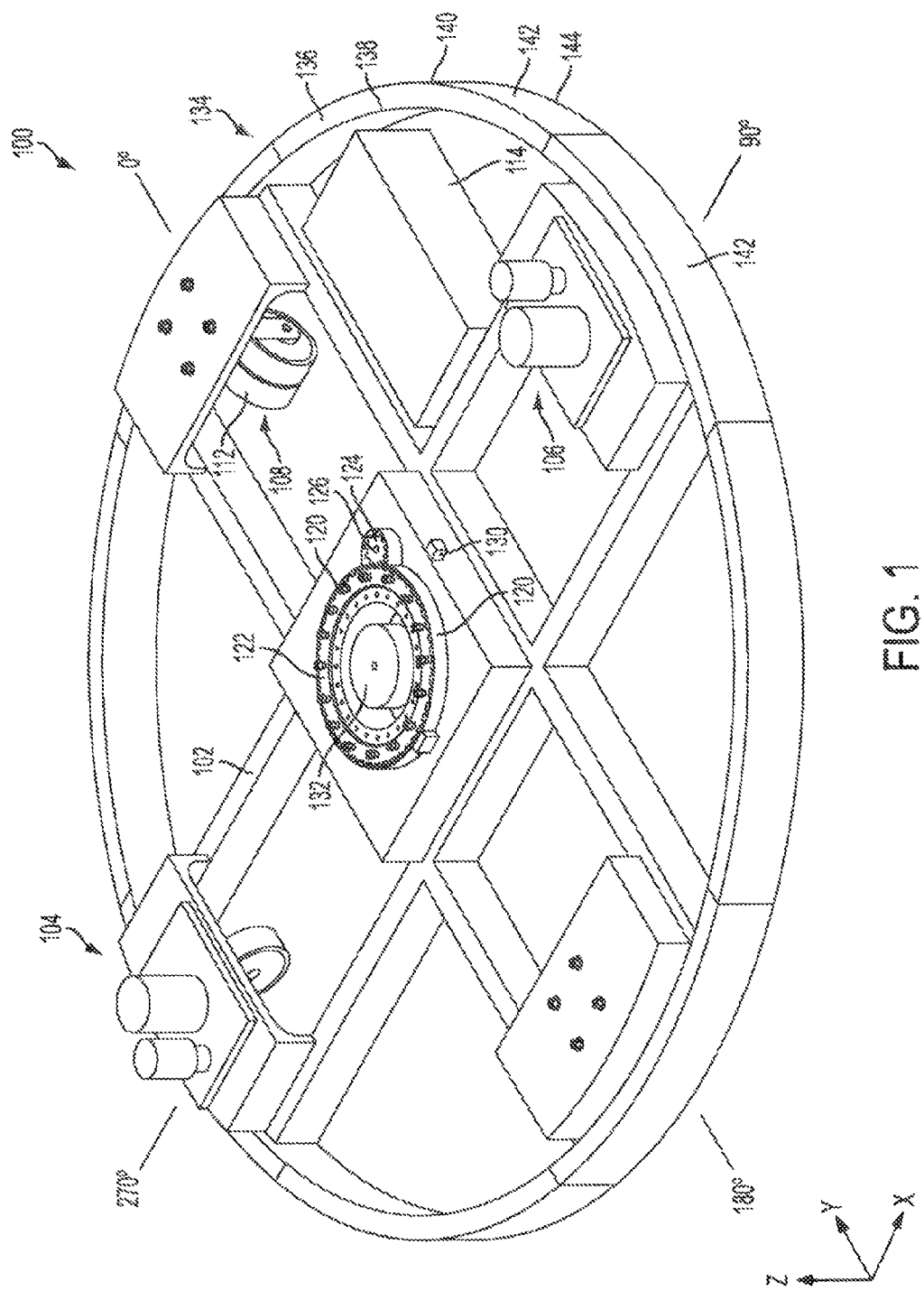
FIG. 1 is a top-side isometric view of a transport assembly of a vehicle in accordance with an embodiment of the invention.
Figure 2:
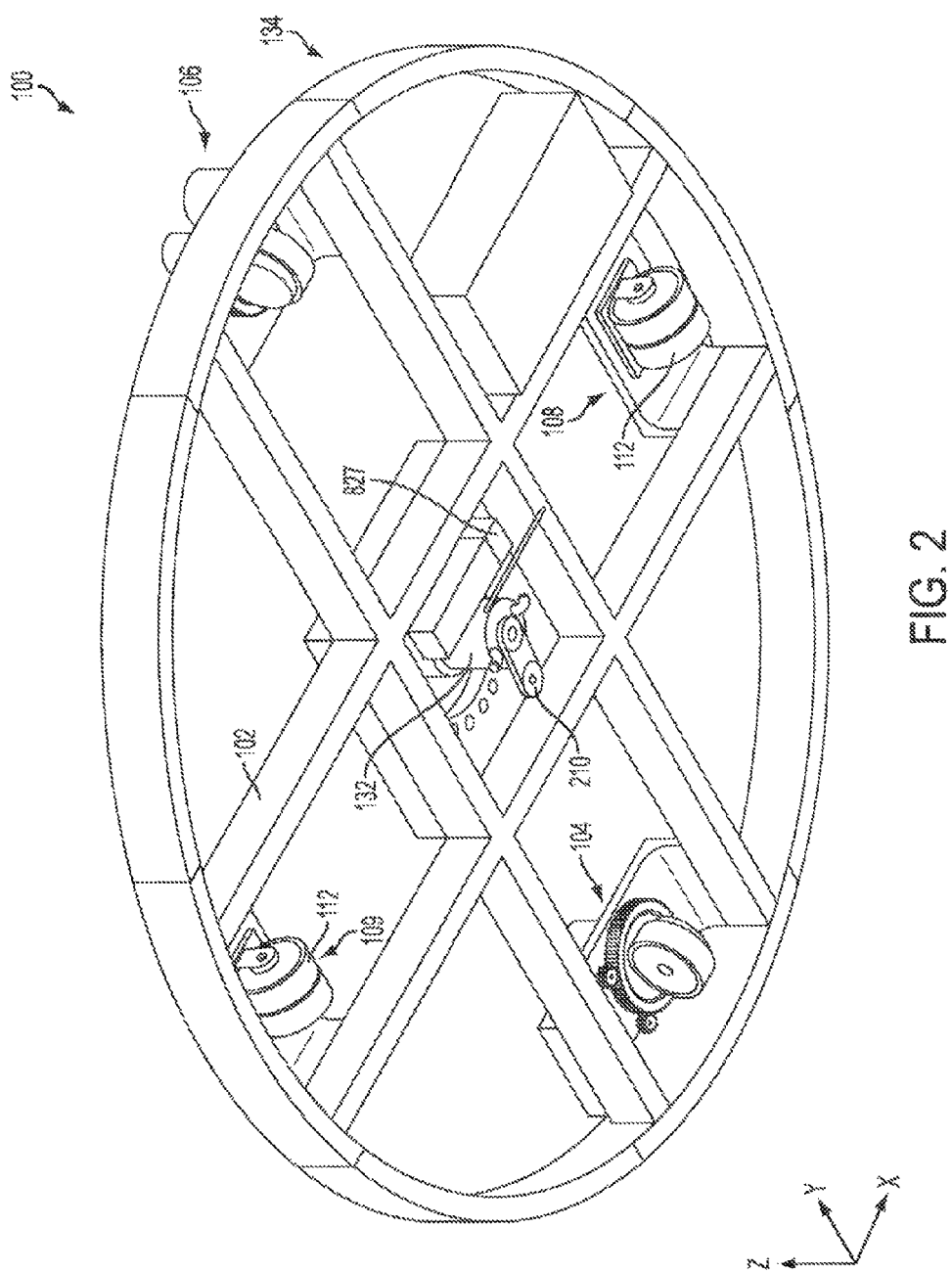
FIG. 2 is a bottom-side isometric view of the transport assembly of the vehicle of FIG. 1.

FIG. 1 is a top-side isometric view of a transport assembly of a vehicle 100, in accordance with an embodiment of the invention. FIG. 2 is a bottom-side isometric view of the transport assembly of the vehicle of FIG. 1. The transport assembly 100 is a structural frame of the ride vehicle. The transport assembly 100 provides multidirectional propulsion. The transport assembly 100 includes a chassis 102. The chassis 102 supports the weight of the vehicle and all occupants riding therein. The transport assembly 100 further includes two steerable propulsion wheels 104, 106, which together may constitute the propulsion system of the transport assembly 100, and two passive casters 108, 109. As used herein, a passive caster 108, 109 is comprised of at least one wheel mounted in a swivel frame and used to support the vehicle. As used herein a steerable propulsion wheel 104, 106 is a device employed to realize steering of its wheel via an integrated steering motor and realize rotation of its wheel to propel the device over a surface of travel by use of an integrated drive motor and transmission assembly. The steering motor can rotate a wheel of the steerable propulsion wheel in 360 degrees of rotation about the z-axis. The steerable propulsion wheels 104, 106 may be mounted to the chassis 102 in spaced apart locations directly opposite one another.

The passive casters 108, 109 may be mounted to the chassis 102 in spaced apart locations directly opposite one another and rotated 90 degrees with respect to the locations of the two steerable propulsion wheels 104, 106. The wheels 112 of the passive casters 108, 109 are freewheeling; that is, the wheels 112 are free to roll clockwise and counterclockwise and are free 8 to swivel (rotate) in any direction. Other configurations of steerable propulsion wheels 104, 106 and passive casters 108, 109 are possible; however, the preferred embodiment of the invention includes at least two steerable propulsion wheels 104, 106. In a preferred embodiment, as shown, the steerable propulsion wheels 104, 106 are positioned at 270 and 90 degrees with respect to the chassis 102. It is, however, within the scope of the invention to position the steerable propulsion wheels 104, 106 at 0 and 180 degrees with respect to the chassis 102.

The chassis 102 may support a battery assembly 114, a control electronics assembly, a motor driver assembly, and various sensors used in cooperation with an on-board navigation system (not shown).

The battery assembly 114 may include a rechargeable battery 910, which may be comprised of one or more battery cells, and a battery management system 912. The battery 910 provides all the energy needed for operation of the ride vehicle between recharging. The battery management system 912 controls and monitors the charging of the battery 910. The battery management system 912 may monitor voltage, temperature, and other parameters of the battery 910 to permit recharging without damaging the elements of the battery 910.

In order to recharge the ride vehicle's battery 910 during times that the vehicle could be coupled to an energizing/charging system, such as while loading or unloading passengers or while paused for a sufficient amount of time at a location within a ride environment, it was determined that it was necessary to provide a given and relatively large amount of power/energy to the vehicle in a short amount of time. The amount of power/energy is dependent on the demands of a given ride vehicle. The amount of time is generally limited by the amount of time a vehicle spends while loading and/or unloading passengers and by the amount of time, if any, the vehicle remains paused within the ride. Such pauses may occur while the vehicle occupants are watching a movie or other presentation. Additionally, the total amount of time needed for recharging may be divided between multiple charging stations that may be visited by a given vehicle in a given ride environment. These values are readily determined without any undue need for experimentation. Known batteries and charging systems were found to be insufficient for this purpose.

In overcoming the problems encountered with known batteries and energizing/charging systems, it was determined that a battery with a large capacity would permit a greater amount of power/energy to be applied to the battery as a function of time in comparison to a battery with a smaller capacity. The final resulting battery for a given ride vehicle depends on the vehicles voltage and current demands as well as the limits imposed on time available for charging as described above. A suitable battery capacity can be determined without undue experimentation once the variables described above are provided to one of skill in the art. The acceptable level of battery depletion between charges may also be a function of the variables described above, and may be unique to every different type of vehicle.

The inventors obtained an unexpected benefit from their decision to maximize battery capacity (to permit high current fast recharging). The capacity required for fast charging was over and above the actual capacity needed for the ride vehicle. Having excess capacity provided the unexpected benefit of reducing the amount of recharging required for ride vehicle operation; thus, reducing the amount of time needed for recharging. Additionally realized due to use of a battery that had greater capacity than required for operational needs was the unexpected benefit of only using a small amount of the battery capacity during each show. According to an embodiment of the invention, the battery 910 cycles between 90 to 100 percent of its full capacity.

The chassis 102 may also support an O-shaped rotational rolling-element bearing, referred to in the art as a "slewing bearing" or "slew bearing" 120. The slew bearing 120 may include an inner and/or an outer gear. In the embodiment of FIG. 1, the teeth of the slew bearing 120 gear are visible on the outer surface of the slew bearing 120. As used herein, for purpose of abbreviation, the portion of the slew bearing 120 that includes the gear will be referred to as the "slew bearing upper-half" 122. The base of the slew bearing 120 may be referred to as the "slew bearing lower-half" 123. The slew bearing pinion motor 827 (FIG. 8) may be comprised of a driveshaft 126 fixed to a slew bearing pinion 124. The slew bearing upper-half 122 rotates in the slew bearing lower-half 123. As the lower half is fixed to the chassis 102, the rotation is with respect to the chassis 102. The teeth of the slew bearing pinion 124 engage the teeth of the slew bearing upper-half 122. The slew bearing pinion motor 827 (FIG. 8) may be fixed to the chassis 102. Accordingly, the drive shaft 126 of the slew bearing pinion motor 827 (FIG. 8), and the 10 driving gear 124, maintain affixed position relative to the chassis 102 while the slew bearing pinion 124 rotates relative to the chassis. The slew bearing upper-half 122 may be driven clockwise or counterclockwise, with respect to the chassis, according to the direction of rotation of the slew bearing pinion 124.

In the embodiment of FIG. 1, the pinion 124 is positioned outside of the slew bearing 120. In an alternate embodiment (not shown), the pinion 124 may be positioned inside the slew bearing 120. In this alternate configuration, the inner gear of the slew bearing 120 would include mesh with a corresponding gear of the pinion 124. In either configuration, the slew bearing upper-half 122 can be rotated, without any need to stop, in the clockwise or counter-clockwise directions. In other words, in a preferred embodiment of the invention, the slew bearing upper-half 122 can be driven clockwise or counterclockwise by an angular amount greater than 360 degrees, without any need to return to an earlier position by rotating in the opposite direction.

An optical encoder 210 indirectly coupled to the slew bearing upper-half 122 may monitor and output information relating to the rotation of the slew bearing 122 to a processor 901. With knowledge of the magnitude and direction of rotation, and of the diameters of the slew bearing upper-half 122 and the pinion 124 at the point where their gears mesh, the processor 901 can calculate the angular position of a reference point set on the slew bearing upper-half 122 in relation to a corresponding reference point on the chassis 102.

Additionally, in an embodiment of the invention, a first part 301 of a sensor can be directly or indirectly coupled to the slew bearing upper-half 122 and a second part 130 of the sensor can be affixed to the chassis 102. The slew bearing upper-half 122 can be driven clockwise or counterclockwise until a signal from the sensor indicates that the first and second parts 301, 130 are in alignment. In this way, a processor controlling the motion of the slew bearing upper-half 122 and monitoring the output of the sensor can rotate the slew bearing upper-half 122 to a known "home" position. All applicable sensor types, such as, for example, a Hall type sensor, an optical sensor, and a point contact sensor, are within the scope of the invention.

The chassis 102 may also include a slip ring or rotary joint 132, to permit communications and power to be transferred to and from components of the chassis 102 to the 11 portions of the vehicle coupled to the slew bearing upper-half 122. A rotary joint 132 is desirable because, as explained above, there is no limit to the amount of rotation of the slew bearing upper-half 122 with respect to the chassis 102.

The chassis 102 may also include a bumper system 134 that can absorb the energy of an impact and spread the load of the impact into the chassis 102. The bumper system 134 may include a durable-compressible foam material 136 sandwiched between an outer wall 138 of the chassis 102 and a resilient outer covering 140, such as a thin sheet of metal. The foam material 136 may be glued or otherwise secured to the outer wall 138. The foam material 136 and the resilient outer covering 140 may be realized in segments 142 that abut or overlap each other. In one embodiment attached to the chassis using bolts and spacer tubes, allowing deflection of the bolts without any protruding hardware. The segments 142 may be anchored to the foam material 136 and/or the outer wall 138 of the chassis 102. The resilient outer covering 140 may be overlaid with another resilient material 144 such as neoprene (to absorb or deflect minor contacts with surfaces. According to a preferred embodiment, the bumper system 134 can absorb and rebound from contact with another similar vehicle or a wall or fixed object in the ride environment when the vehicle is moving at its highest allowable speed.

Figure 3:
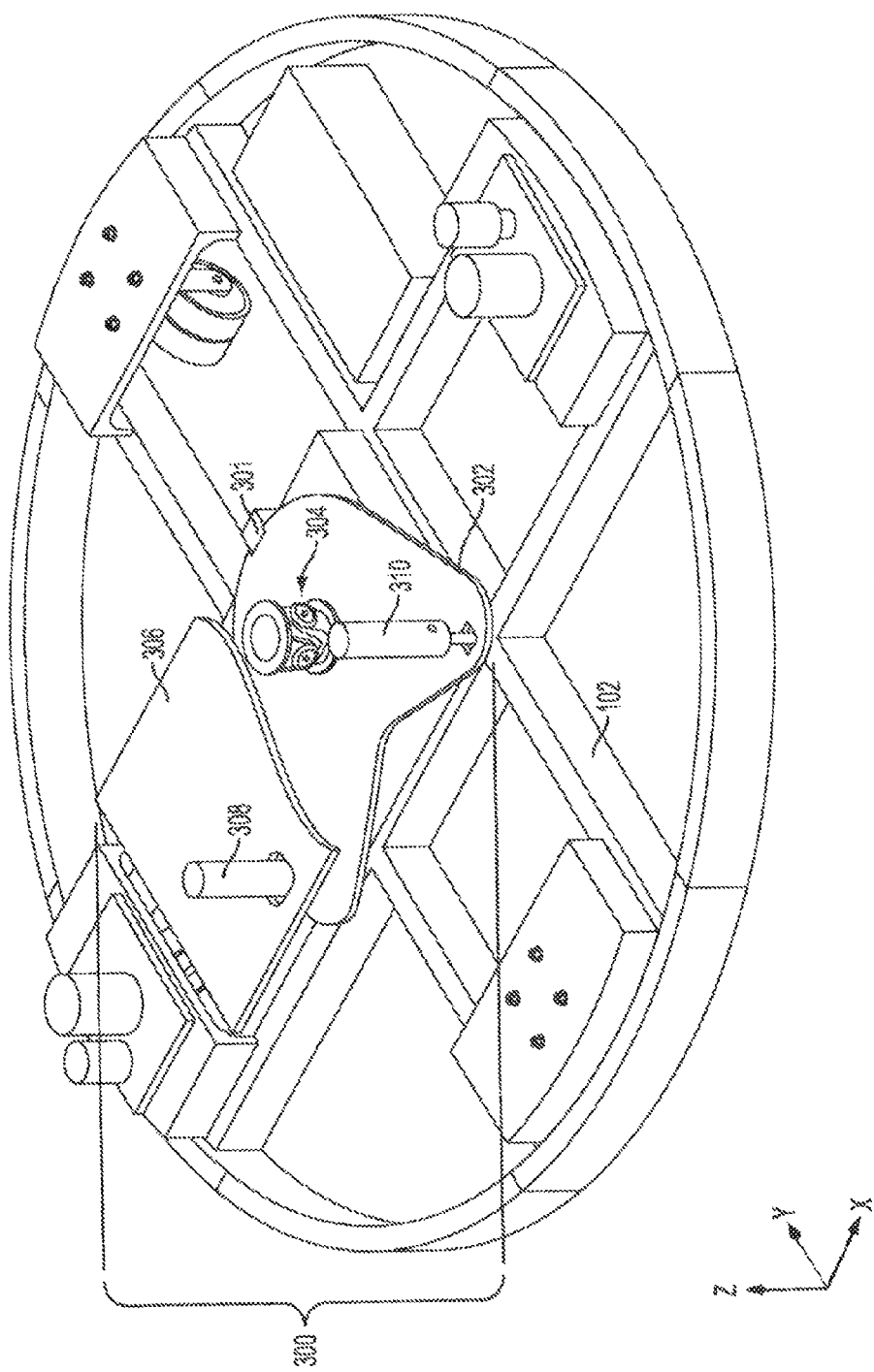
FIG. 3 is a top-side isometric view of the transport assembly of FIG. 1 with a motion assembly mounted thereon, wherein a portion of the motion assembly is shown in partial cutaway/partial phantom view, all in accordance with an embodiment of the invention.

FIG. 3 is a top-side isometric view of the transport assembly 100 of FIG. 1 with a motion assembly 300 mounted thereon, wherein a portion of the motion assembly 300 is shown in partial cutaway/partial phantom view, all in accordance with an embodiment of the invention. In more detail, the motion assembly 300 may be placed on the top surface of the slew bearing upper-half 122 and fixed to the slew bearing upper-half 122. In a preferred embodiment, the motion assembly 300 is bolted to the slew bearing upper-half 122. The components of, and the function of, the motion assembly 300 will be described in detail later, with reference to FIGS. 7A and 7B.

By way of introduction, the motion assembly 300 may include a lower reaction plate 302, a pivot joint or pivotable coupling 304, an upper reaction plate 306 (shown in partial cutaway/partial phantom view), and at least two linear actuators 308, 310. The lower reaction plate 302 is fixed to the slew bearing upper-half 122, as explained above. The pivotable coupling 304 is coupled at a lower end to the lower reaction plate 302 and at an upper end to the 12 upper reaction plate 306. In one embodiment, the pivotable coupling 304 is mounted above the geometric center of the slew bearing 120; however, other locations are acceptable. The linear actuators 308 are each coupled at a lower end to the lower reaction plate 302 and at an upper end to the upper reaction plate 306. The linear actuators 308, 310 are spaced apart from each other and from the pivotable coupling 304. In one embodiment, a first linear actuator 308 is positioned on the right-rear side of the motion assembly 300 and a second linear actuator 310 is positioned on the left-rear side of the motion assembly 300, both further toward the rear of the motion assembly 300 than the pivotable coupling 304. Other orientations are acceptable, so long as the alternate orientation results in a motion assembly whose upper reaction plate is moved in pitch and roll with relation to the lower reaction plate and the movement is centered above the pivotable coupling 304, where the pivotable coupling is a substantially fixed height and substantially non-compressible.

Figure 4:
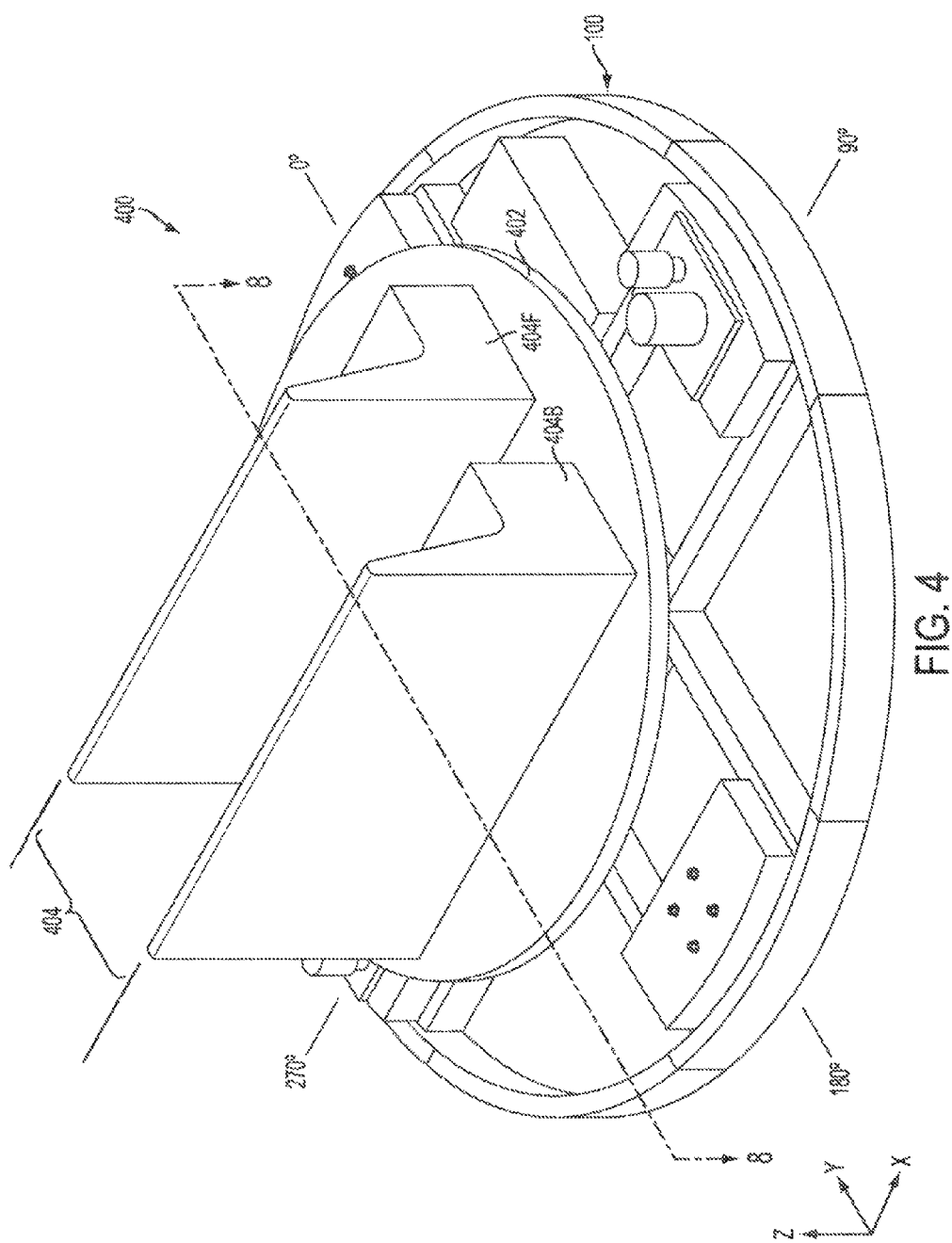
FIG. 4 is an isometric view of the transport assembly and motion assembly of the vehicle of FIG. 3 with passenger seating mounted atop the motion assembly, in accordance with an embodiment of the invention.

FIG. 4 is an isometric view of a vehicle 400 comprised of the combined transport assembly 100 and motion assembly 300 of FIG. 3, and additionally includes a passenger platform 402 mounted atop the motion assembly 300 and rows of seating 404 mounted atop the passenger platform 402, all in accordance with an embodiment of the invention. In an alternate embodiment, the rows of seating could be mounted directly to the upper reaction plate 306 without a need for a separate passenger platform 402. In the alternate embodiment, the upper reaction plate 306 would serve the purpose of a passenger platform.

For purposes of discussion herein, using FIG. 4 as a reference, the rows of seats 404 and the transport assembly 100 of the vehicle 400 are considered as facing forward toward 0 degrees on a compass. The right sides of the rows of seats 404 and of the transport assembly 100 of the vehicle 400 are adjacent to a point at 90 degrees on the compass. The back sides of the rows of seats 404 and the back side of the transport assembly 100 of the vehicle 400 face back toward to 180 degrees on the compass. The left sides of the rows of seats 404 and the transport assembly 100 of the vehicle 400 are adjacent to a point at 270 degrees on the compass. Of course, the rows of seats 404 and the transport assembly 100 can face and travel in other directions while simultaneously being in alignment or while being rotated about each other by virtue of the coupling of the rows of sets to the slew bearing upper-half 122. As used herein, using FIG. 4 for reference, the y-axis is aligned with the 180 and 0 degree points on the compass, 13 the x-axis is aligned with the 270 and 90 degree points on the compass, and the z-axis extends upward perpendicular to the surface on which the vehicle 400 sits. The words "moving forward" or "traveling forward" indicate motion in an increasingly positive direction along the y-axis. Motions or travel to the left, right, and reverse (or back or backward) directions have their customary meanings with reference to the forward direction.

The preferred embodiment of FIG. 4 illustrates two parallel rows of seating: a front row 404F, and a back row 404B. The rows of seating are perpendicular to the y-axis. In the embodiment shown, each of the rows of seats 404 includes four seats. Even numbers of rows and seats are preferred. However, other configurations and numbers of seats are within the scope of the invention. For example, a fewer or greater number of seats in one or more rows and odd numbers of rows and/or seats in the rows are within the scope of the invention. Furthermore, seats arranged in a circle, facing inward or outward, are also within the scope of the invention.

According to the preferred embodiment, the two rows of seats 404 having four seats each are positioned equidistant from an imaginary point on the upper surface of the passenger platform 402. The vertical axis passing through this point preferably passes through the geometric center of the slew bearing 120. This permits a non-eccentric rotation of the rows of seats 404 with respect to the slew bearing 120. If this point is also positioned above a midpoint on an imaginary horizontal axis running between the left and right steerable propulsion wheels 104, 106, the center of rotation of the rows of seats 404 will coincide with respect to the center of motion of the chassis 102. If this point also intersects an imaginary vertical axis running through the pivotable coupling 304, the rows of seats, which are positioned equidistant from this point, will experience relatively equal amounts of vertical deflection as the motion assembly 300 moves in pitch and roll. Of course, other positions of the rows of seats 404 with respect to the point, and with respect to the point, the imaginary axis running between the left and right steerable propulsion wheels 104, 106, and the vertical axis of the pivotable coupling 304 are within the scope of the invention. Nevertheless, with alignment described above, the seating depicted in FIG. 4 are all subject to relatively equal experiences during yaw, pitch, and roll maneuvers. 14

Figure 5:
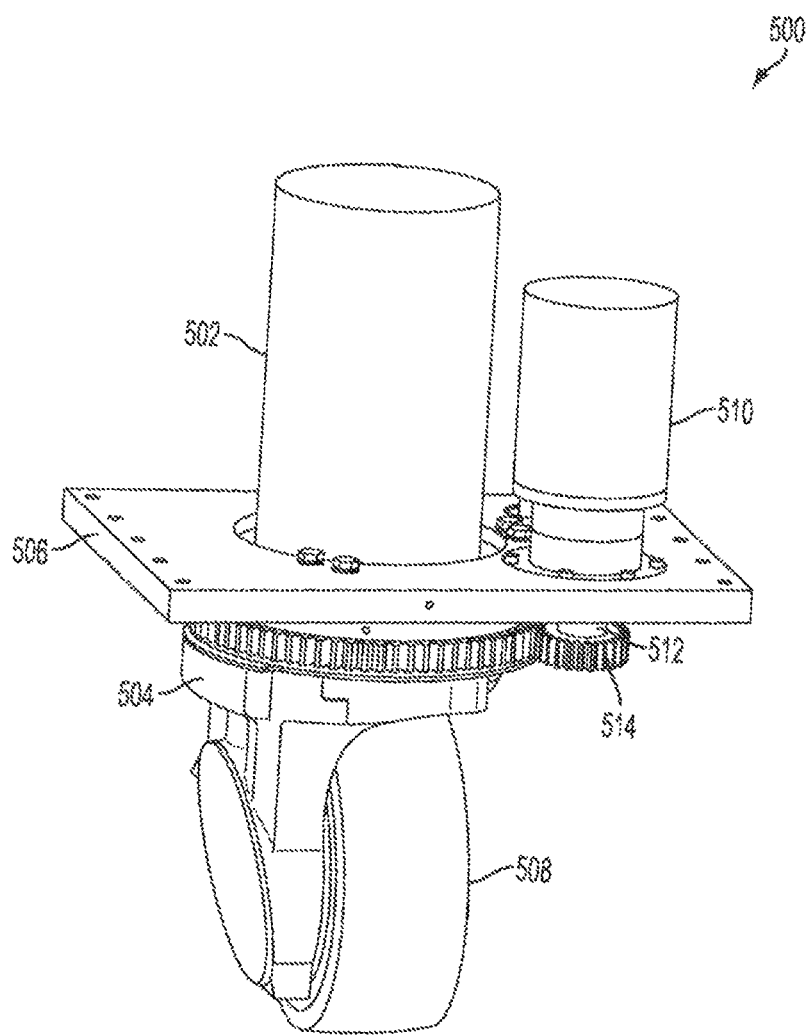
FIG. 5 is an example of a powered steerable propulsion wheel of the kind shown in FIGS. 1,2, and 3, in accordance with an embodiment of the invention.

FIG. 5 is an example of a powered steerable propulsion wheel 500 (similar to 104, 106 FIGS. 1-3), in accordance with an embodiment of the invention. The steerable propulsion wheel 500 includes an electrical motor 502 and a transmission assembly 504 mounted on opposite sides of a base plate 506. If used in the embodiment of FIG. 1, the base plate 506 may be fixed to the chassis 102 of the transport assembly 100. The motor 502 drives the transmission 504, which drives the wheel 508. The transmission 504 is configured to rotate the wheel 508 of the steerable propulsion wheel 500 in a plane perpendicular to the ground to provide motive force to the transport assembly 100. The powered steerable propulsion wheel 500 further includes an electrical steering motor 510 mounted to one side of the base plate 506. The shaft 512 of the steering motor 510 is fixed to a steering pinion gear 514. The steering pinion gear 514 engages a directional gear 516. Similar to the operation of the slew bearing 120 and slew bearing pinion 124, the directional gear 516 is fixed to the transmission assembly 504, which is fixed to and rotates in a horizontal plane with the swivelable wheel 508 of the steerable propulsion wheel 500. The steering motor 510 is fixed to the base plate 506. The shaft 512 of the steering motor 510 and the steering pinion gear 514 maintains their location relative to the base plate 506. When the shaft 512 of the steering motor 510 rotates the steering pinion gear 514, the directional gear 516 rotates relative to the base 506 and thereby forces the transmission assembly 504, and the wheel 508 coupled thereto, to swivel around a vertical axis. In accordance with this description, a processor would be able to execute commands to drive the electrical motor 502 at a given speed. With knowledge of the transmission assembly's 504 gearing ratio and with knowledge of the diameter of wheel 508, the processor would be able to calculate the amount of rotation of the wheel 508 in a given amount of time. Accordingly, the processor could determine how far the steerable propulsion wheel 500 had moved across a surface. Additionally, given knowledge of the amount of rotation of the shaft 512 of the steering motor 510 and the diameters of the steering pinion gear 514 and directional gear 516, the processor could command the swivelable wheel 508 to steer in any direction on the compass.

FIGS. 6A, 6B, 6C, and 6D illustrate various motions that can be accomplished by a transport assembly 600 of a vehicle having two steerable propulsion wheels 104, 106 and two passive casters 108, 109 in accordance with an embodiment of the invention. The illustrations are top views. Rows of seats 404F, 404B are shown for reference. In the illustrations, the seats 404F, 404B remain pointed at 0 degrees, while the transport assembly 600 rotates underneath 15 them. Rotation of the transport assembly 600 relative to the seats 404F, 404B is achieved by the action of the slew bearing 120.

Figure 6A:
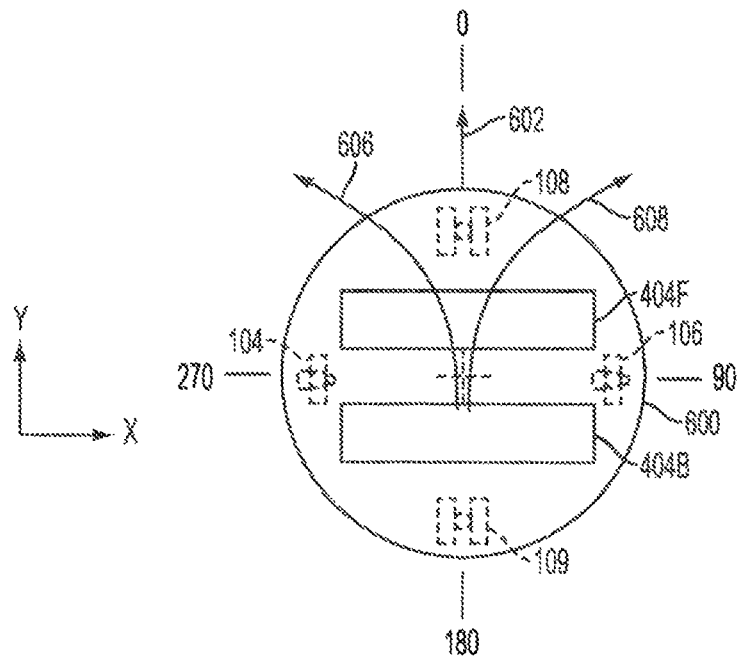
FIGS. 6A, 6B, 6C, and 6D illustrate various motions that can be accomplished by a transport assembly of a vehicle in accordance with an embodiment of the invention.

FIG. 6A illustrates three forward directions of motion achieved by a transport assembly 600 having steerable propulsion wheels and passive casters configured in the manner of the vehicle 400 of FIG. 4. In the illustration of FIG. 6A, the steerable propulsion wheels 104, 106 and the wheels of the passive casters 108, 109 are depicted as being aligned parallel to the y axis (which is understood to be 0 degrees). To achieve this alignment, if the steerable propulsion wheels 104, 106 are not already so aligned, a processor (not shown) can command each steerable propulsion wheel 104, 106 to rotate to 0 degrees. As travel begins, the passive casters 108, 109 will align with the steerable propulsion wheels 104, 106.

With the left and right steerable propulsion wheels 104, 106 positioned at 0 degrees, a command from the processor to simultaneously drive the wheels of the left and right steerable propulsion wheels 104, 106 at the same speed in a forward direction will cause the vehicle 600 to be propelled forward, in a direction of arrow 602.

A command to rotate both the left and right steerable propulsion wheels 104, 106 forward, where the left wheel 104 is commanded to rotate slower than the right wheel 106, will cause the vehicle to be propelled in a wide curving left turn, as indicated by arrow 606.

A command to rotate the both the left and right steerable propulsion wheels 104, 106 forward, where the left wheel 104 is commanded to rotate faster than the right wheel 106, will cause the vehicle to be propelled in a wide curving right turn, as indicated by arrow 608.

The widths of the turns described above may be determined by the difference in speed between the left and right steerable propulsion wheels 104, 106. For example, command to rotate only the right wheel 106 forward, without rotating the left wheel 104 will cause the vehicle to be propelled in a sharp left turn. A command to rotate only the left wheel 104 forward, without rotating the right wheel 106 will cause the vehicle to be propelled in a sharp right turn.

Reversing the directions of the rotating wheels will cause the vehicle to be propelled in respective reverse directions. 16

Figure 6B:
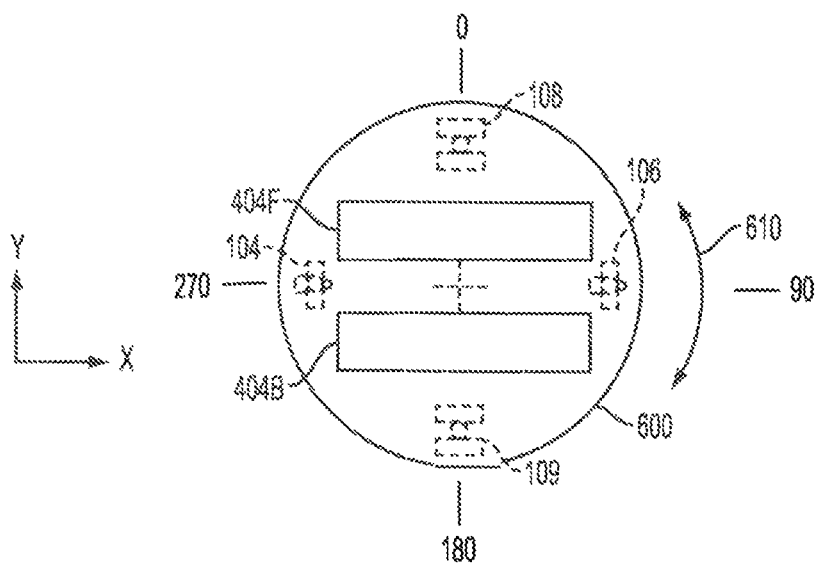

A benefit of the configuration of at least two steerable propulsion wheels 104, 106 and passive casters 108, 109 is that the vehicle 600 can be made to perform zero degree turns as shown in FIG. 6B. Such a turn may be executed with the wheels of the left and right steerable propulsion wheels 104, 106 at their 0 degree bearing positions while the processor issues commands to rotate the wheels of the steerable propulsion wheels 104, 106 in opposite directions at equal speeds. Clockwise and counter clockwise zero degree turns, as represented by arrow 610, can be performed by reversing the respective rotation directions of the wheels.

As shown in FIG. 6B, because the passive casters 108, 109 are free to swivel in any direction, they naturally and passively swivel to a direction that is perpendicular to the direction of steerable propulsion wheels 104, 106 (after movement of the vehicle commences)

Another benefit of the configuration of at least two steerable propulsion wheels 104, 106 (and passive casters 108, 109) is that the transport assembly 600 can be made to "crab"to the left or right. Typically, the term "crab," is used in the context of aircraft navigation. Merriam-Webster's dictionary, defines "crab" as "the angular difference between an aircraft's course and the heading necessary to make that course in the presence of a crosswind." In the aircraft context, a crosswind is a direction of the wind that is not parallel to the aircraft's course. By way of example, if a landing strip ran in a North-South direction (where North is at 0 degrees and south is at 180 degrees) along the y-axis, and a crosswind was blowing in from the right, the aircraft might assume a heading of 5 degrees in order maintain a course (i.e., a direction of travel) of zero degrees for landing.

Figure 6C:
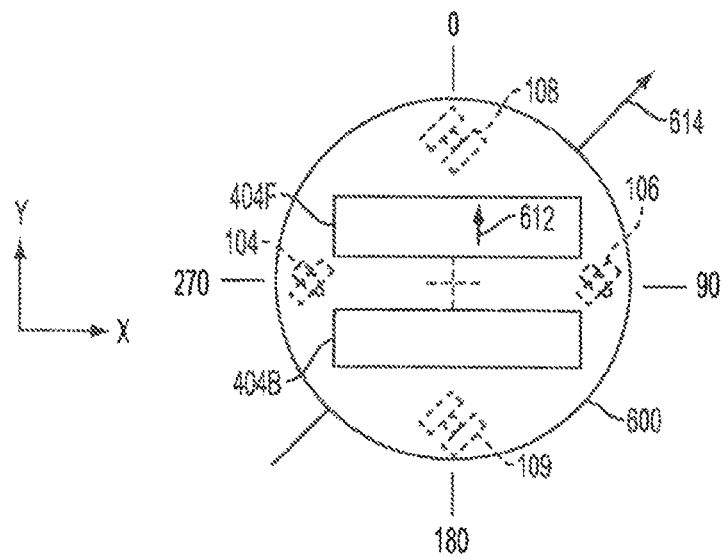

In the context of the present application, the term "crab" takes on a different meaning. As used herein, the term crab is best described by way of the following examples. In FIG. 6C the rows of seating **604*f*, 604B are maintained in the forward direction, such that a seated passenger would be facing in the direction of arrow 612, parallel to the y-axis, while at the same time the transport assembly 600 of the vehicle is moving in a diagonal direction as shown by arrow 614. Although arrow 614 is depicted as pointing toward 45 degrees, for purposes of crabbing, the angle between the direction that the rows of seats 604*f*, 604B are facing and the direction that the transport assembly 600 is moving will be greater than 0 degrees. In other words, as shown in FIG. 6C, while the rows of seats 604F, 604B** and the passengers thereon face degrees, the vehicle "crabs" in a direction of 45 degrees. Crabbing is not limited to linear 17 motions. The vehicle may crab, for example, along a curve, circle, or increasing or decreasing diameter spiral.

To achieve a crabbing motion such as that depicted in FIG. 6C, the processor commands the steerable propulsion wheels 104, 106 to rotate clockwise to a direction of 45 degrees and to simultaneously rotate at the same speed. In this state, although the seats 404F, 404B of the vehicle face toward 0 degrees, the transport assembly 600 of the vehicle moves in the direction of arrow 614, that is, 45 degrees.

Vehicles in accordance with embodiments of the invention are configured to crab to the left or the right, in both forward and reverse directions. A vehicle in accordance with embodiments of the invention can crab at any angle between, but not equal to, 0 and 180 degrees and between, but not equal to, 180 and 360 degrees (the angles of 0 and 180 degree are reserved for forward and reverse motion, respectively). Nevertheless, vehicles in accordance with embodiments of the invention can be said to be crabbing if the transport assembly is rotating through a range of angular positions that include 0, 180, or 360 degrees. For example, if the rows of seats 404F, 404B were maintained in a position pointing at 0 degrees, while the transport assembly 600 followed a curve that caused its "front" to point at an arc including the range of 120 to 200 degrees, the vehicle would be crabbing despite it having passed through 180 degrees.

Figure 6D:
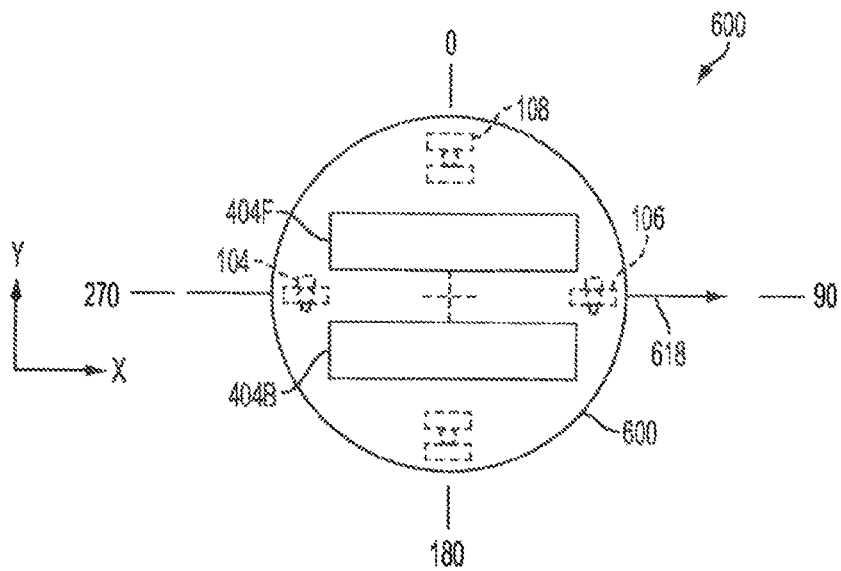

FIG. 6D illustrates a case where the processor commands the steerable propulsion wheels 104, 106 to swivel clockwise to head toward 90 degrees and to simultaneously rotate at the same speed. In this state, although the seats 404F, 404B of the vehicle point toward 0 degrees, the transport assembly 600 of the vehicle moves in the direction of arrow 616, directly to the right toward 90 degrees in the direction of arrow 618. Crabbing to the left (i.e. a moving in the direction of 270 degrees) can be accomplished by reversing the direction of rotation of the wheels, while maintaining the orientation at 90 degrees, or by rotating the steerable propulsion wheels 104, 106 to head toward 270 degrees and to simultaneously rotate at the same speed in the same direction.

Crabbing motion is not possible with a trackless vehicle that has less than two steerable propulsion wheels. Crabbing motion is not possible with a trackless vehicle that has two steerable propulsion wheels that do not rotate about the z-axis (i.e., they do not steer). Such 18 vehicles turn using differential steering, such as that described with reference to FIG. 6A. Vehicles used in the art of amusement rides, which are known to the inventors, cannot crab because no known vehicles make use of at least two steerable propulsion wheels and a passenger platform that rotates with respect to the chassis via use of a slew bearing.

Figure 7A:
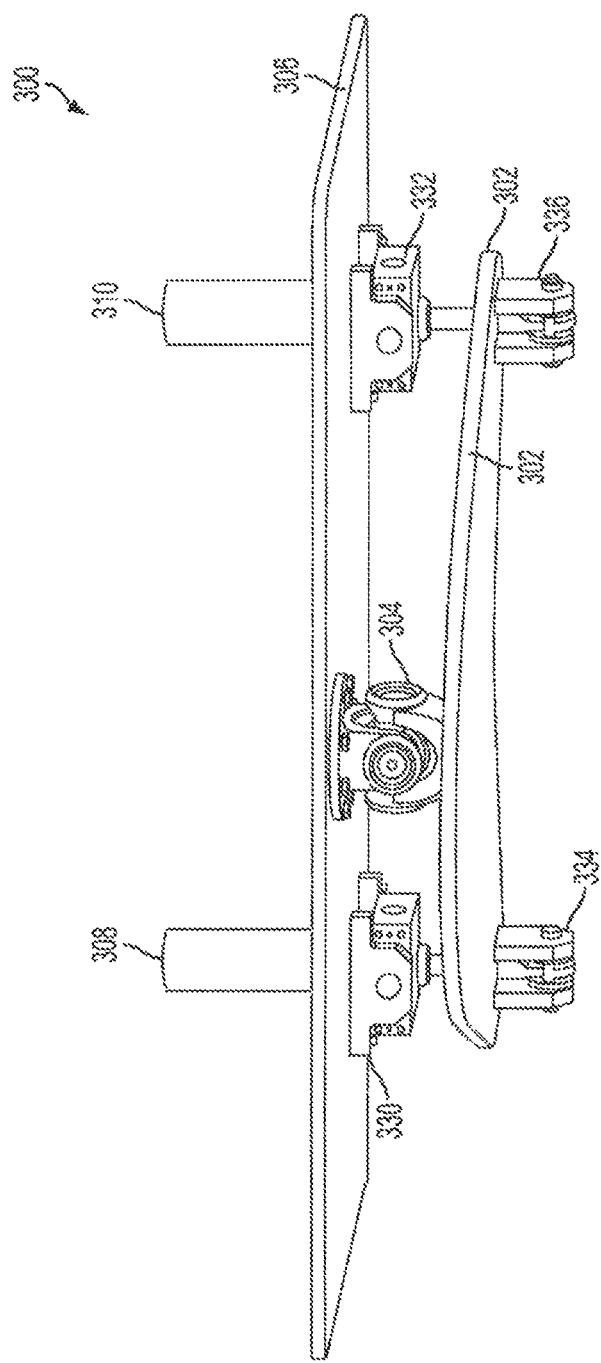

FIGS. 7A and 7B are front-lower and rear-upper isometric views of a motion assembly 300, in accordance with an embodiment of the invention. The motion assembly 300 may include a lower reaction plate 302, a pivotable coupling 304, an upper reaction plate 306, and at least two linear actuators 308, 310. In a preferred embodiment, the linear actuators 308, 310 are of the electrical type. Other types of linear actuators, such as screw type and hydraulic type, are within the scope of the invention. The pivotable coupling 304 is fixed at a lower end to the lower reaction plate 302 and at an upper end to the upper reaction plate 306. In an embodiment of a vehicle having two rows of seats, to ensure that the point on which the passenger platform pivots is not eccentric with the rotation of the slew bearing, the pivotable coupling 304 may be positioned such that its vertical axis coincides with the geometric center of the slew bearing 120. The linear actuators 308, 310 are fixed to couplings 330, 332, respectively, at their upper ends. The couplings 330, 332 are in turn fixed to the upper reaction plate 306. The linear actuators 308,310 are fixed to clevis assemblies 334, 336, respectively, at their lower ends. The clevis assemblies 334, 336 are in turn fixed to the lower reaction plate 302. The couplings 330, 332 may be realized as gimbals. The gimbals 330, 332 permit the linear actuators to incline at a wide range of angles as the lower and upper reaction plates 302, 306 move relative to one another in pitch and roll.

The motion assembly 300 mechanically transmits pitch and roll movements (about the pivotable coupling 304) to the rows of seats 404 fixed to the passenger platform 402 via the upper reaction plate 306. The extension and retraction of the linear actuators 308, 310 relative to one another determines the amount of pitch and roll experienced by the upper reaction plate relative to the lower reaction plate.

The maximum force required from each linear actuator 308,310 (for extension and retraction) can be calculated given information including the geometry of the placement of rows of seating, placement of the linear actuators with respect to the pivotable coupling 304, and 19 knowledge of the loading expected on the upper reaction plate 306. Such calculations are known to those of skill in the art. It will be understood that as the mounting points of the linear actuators 308, 310 move away from the pivotable coupling 304, the force required from each linear actuator decreases as the length of the moment arm between the mounting point and the pivotable coupling 304 increases. However, this reduction in force is limited by the stroke of the linear actuators as well as the speed at which linear actuators can extend and retract.

In a preferred embodiment the pivotable coupling 304 may be a dual shaft coupling that is capable of transmitting torque from one shaft to another, even when the dual shafts are not collinear. The pivotable coupling 304 transfers torque from the one shaft to another, even if the shafts are not aligned. The pivotable coupling 304 is preferably non-compressible, or substantially non-compressible. The pivotable coupling 304 preferably supports the weight of a maximum passenger load, plus the weight of all hardware components that are supported by the upper reaction plate 306. These components include, seating, miscellaneous electronics including sound and lighting devices, safety equipment and electronic monitoring and control equipment, and any decorative structure designed to hide electromechanical aspects of the vehicle and give the vehicle an appearance that is appropriate for the theme of the amusement ride. In a preferred embodiment, and as illustrated in FIGS. 3, 7A, 7B, and 8, the pivotable coupling 304 may be a U-joint (also known as a universal joint or universal coupling).

Use of the pivotable coupling 304 resulted in a significant power savings for the vehicle in comparison to a vehicle that could provide the same pitch, roll, and yaw motions on a battery operated self-movable assembly. In the known art, ride vehicles may provide three or four degrees of movement. A three degree of movement ride vehicle might provide the experiences of pitch, roll, and heave. Pitch may be likened to tilting forward or backward (as experienced in a climbing or diving aircraft). Roll may be likened to tilting right or left. Heave may be likened to the experience of being lifted up or dropped down along a vertical axis. In addition to the pitch, roll, and heave experiences, a four degree of movement ride vehicle might also provide the experience of yaw. Yaw can be likened to the movement of a record on a turntable. 20

In a typical configuration of a ride vehicle, the experiences of pitch, roll, and heave are typically achieved by supporting the payload (i.e., the passengers, the passenger cabin, and its contents) in a neutral position using three or four electrical or pneumatic linear actuators and a system of lateral stabilizers. Heave is experienced by moving the payload from the neutral position in the upward or downward directions along the vertical axis by extending or retracting the linear actuators at the same time and at the same rate. The experiences of pitch and/or roll are typically achieved by extending or retracting one or more of the linear actuators at the same time and at different rates, or in different directions relative to one another. As one of ordinary skill in the art would recognize, the amount of energy consumed to merely support the payload in the neutral position, let alone thrusting the payload in the pitch, roll, and/or heave directions, can be significant. The inventors required a way to reduce energy consumption, especially because the inventors were designing a battery operated vehicle.

The inventors recognized that when the payload was mechanically supported at a fixed height on a centralized pivotable point, the pivotable point was not required to move along its vertical axis, and only two linear actuators were used (as shown in the embodiments described herein), the energy required for the experiences of pitch and roll were significantly lessened in comparison to the typical configurations of ride vehicles as described above. The inventors surmised that in the configuration of the embodiments described herein, the linear actuators only consumed the amounts of energy needed to tip the passenger platform upward or downward about the central pivot point; the central pivot point essentially was supporting most of the payload's weight.

The inventors concluded that an enjoyable three dimension ride vehicle for daily use at a typical amusement facility having large patron throughput requirements, which offered the experiences of pitch, roll, and yaw, was achievable in a battery operated configuration. Accordingly, the inventors achieved a real world benefit of significant energy savings by use of a ride vehicle having a configuration similar to the embodiments of the invention described herein, in comparison to typically configured ride vehicles.

According to the preferred embodiments, the pivotable coupling 304, which provides the above-described centralized pivotable point, preferably prevents all or most lateral motion of 21 the upper reaction plate 306. One can visualize the reasoning for this requirement if one were to replace the pivotable coupling 304 with a spring with no lateral support. Although the spring can be constructed to support the weight placed on the upper reaction plate 306, the spring, when bent, could permit the upper reaction plate 306 to slide laterally. An acceptable pivotable coupling using a ball and socket, spring, flexible rubber, or fiberglass shaft, or equivalents (assuming these alternative components could withstand the dynamic forces exerted on them by the moving payload) would require the use of lateral stabilizing devices. Accordingly, a ball and socket, spring, flexible rubber, or flexible fiberglass shaft, or equivalents, in combination with lateral stabilizing devices, may be considered pivotable couplings that are within the scope of this invention.

Figure 8:
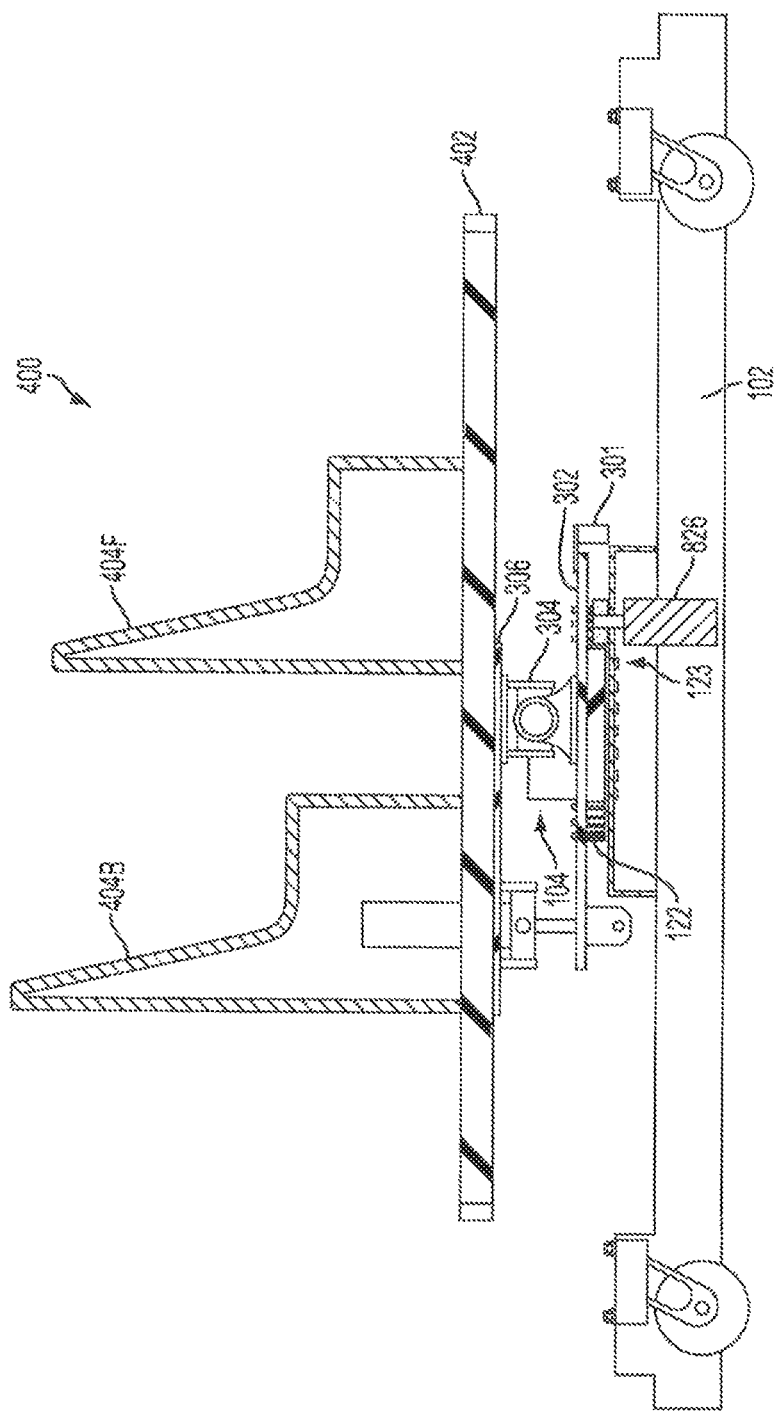
FIG. 8 is a right-side partial-cross-section elevation view of a vehicle in accordance with an embodiment of the invention.

FIG. 8 is a right-side partial-cross-section elevation view of the vehicle 400 in accordance with an embodiment of the invention. As described above, the vehicle 400 is comprised of two parallel rows 404F, 404B of four seats each. The rows of seating 404F, 404B are fixed to a passenger platform 402. The passenger platform 402 is fixed to the upper reaction plate 306. A pivotable coupling 304, is fixed at its upper end to the upper reaction plate 306 and at its lower end to the lower reaction plate 302. Each of a pair of linear actuators are coupled at their respective upper ends to the upper reaction plate 306 and at their respective lower ends to the lower reaction plate 302. In the illustration of FIG. 8, only one linear actuator 308 (located on the left side of the motion assembly) is shown. Four wheels are coupled to the chassis. In the illustration of FIG. 8, two passive casters 108, 109 are shown. One steerable propulsion wheel 104 is partially shown. The lower reaction plate 302 is fixed to the slew bearing upper-half 122. The slew bearing lower-half, or slew bearing base 123 is fixed to the chassis 102. For ease of illustration, the rotary joint 132 is omitted from the illustration of FIG. 8.

In the embodiments disclosed, the rows of seats 404F, 404B, which are fixed to the upper reaction plate 306 of the motion assembly 300 via the passenger platform 402, can be moved in pitch and roll. Because the motion assembly 300 is fixed atop the slew bearing upperhalf 122, the motion assembly 300 can be rotated. The result of these movements allows passengers sitting in the rows of seats 404F, 404B to experience pitch, roll, and yaw.

An alternate embodiment, in which the positions of the motion assembly 300 and the slew bearing 120 are reversed, is within the scope of the invention. In other words, it is within the scope of the invention to fix the lower reaction plate 302 of the motion assembly 300 directly to the chassis 102, and fix the slew bearing 120 to the upper reaction plate 306. In either embodiment, the patrons would experience pitch, roll, and yaw. Nevertheless, the inventors found that the configuration of the alternate embodiment increases the difficulty of positioning the rows of seats 404F, 404B in three-dimensional space. Accordingly, in preferred embodiments such as those of FIGS. 1-8, the slew bearing 120 is fixed to the chassis 102 and the motion assembly 300 is fixed atop the slew bearing 120.

Figure 9:
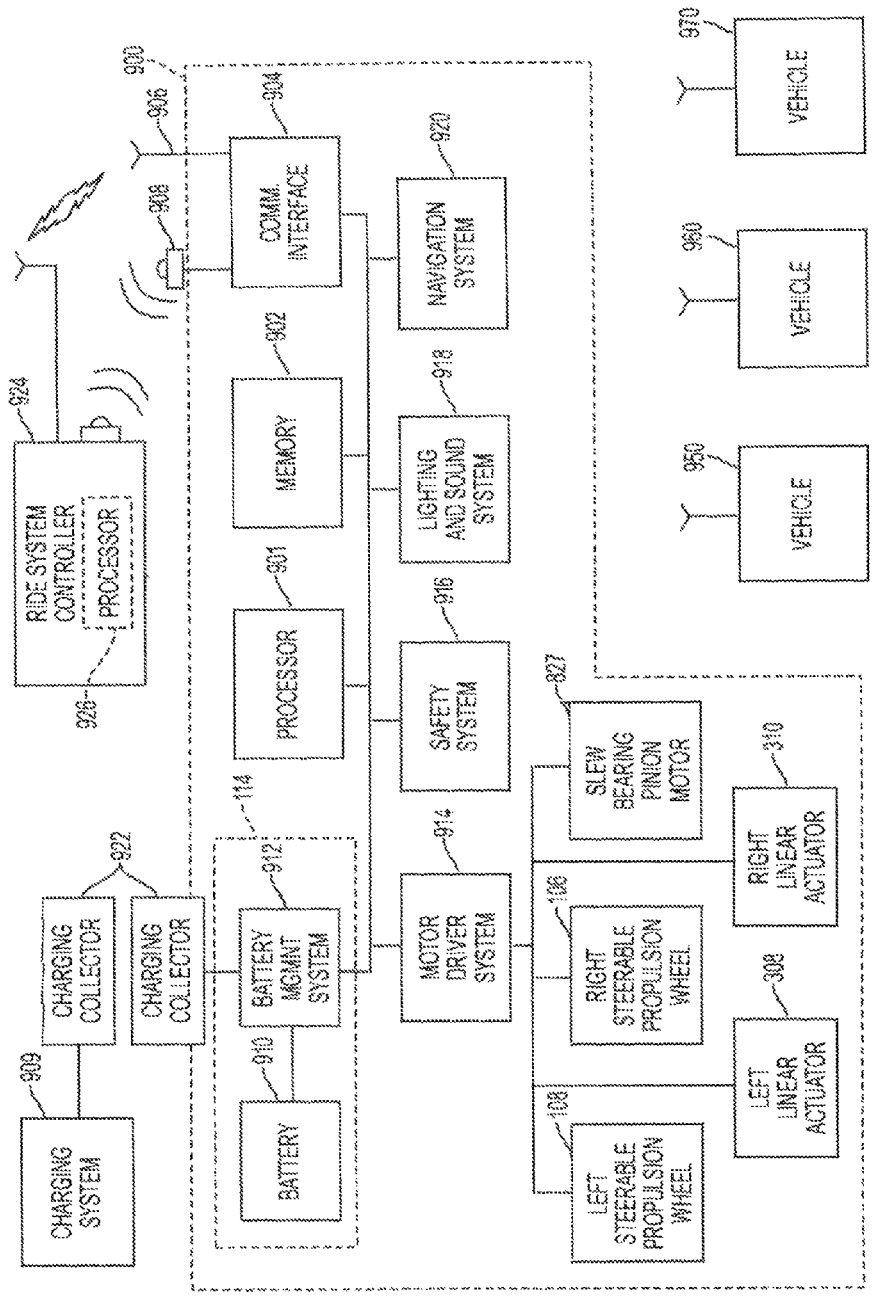
FIG. 9 is a block diagram of a vehicle and system in accordance with an embodiment of the invention.

FIG. 9 is a block diagram of a vehicle 900 and system in accordance with an embodiment of the invention. The vehicle 900 includes a controller or processor 900 to execute commands stored in a memory 902. The commands may be stored on or in a non-transitory computer readable medium of the memory 902. The vehicle includes a communication interface 904 that may communicate wirelessly with other communication interfaces via one or more antenna 906 or infrared 908 devices or equivalents. The vehicle's 900 communication interface 904 may operate under one or more communication protocols. The vehicle 900 is uniquely addressable via the communication interface 904. Accordingly, a ride system controller 924, monitoring a plurality of vehicles in a ride, is not limited to commanding all of the plurality of vehicles with the same command at the same time. The unique addressability of one vehicle 900 in the plurality of vehicles permits a command to be issued and executed by only the one vehicle 900. The unique addressability of each vehicle in the plurality of vehicles thus permits unicast and multicast type issuances of commands. That is, a command may be issued to one vehicle 900, a subset of the plurality of vehicles, or the entire plurality of vehicles, The vehicle 900 includes a battery 910 coupled to a battery management system 912. The battery system 114 may couple to a charging system 909 via the use of contact or contactless couplings 922 known to those of skill in the art. The vehicle includes motor driver system 914. The motor driver system 914 drives the various motors of the vehicle 900. Included among the motors are the left and right steerable propulsion wheels 104, 106; each steerable propulsion wheel 104, 106 having separate motors for steering and driving (propulsion); the slew bearing pinion motor 827 (FIG. 8), and the motors of the left and right linear actuators 308, 310. The vehicle may also include a safety system 916, which includes various safety components (such as door open/close detectors and the like). The vehicle also includes a lighting and sound system 918 including various lighting and sound components.

The vehicle may also include a navigation system 920 having one or more navigation sensors 922. In a preferred embodiment, the vehicle uses a free range on grid navigation system. Multiple types of sensors 922 may be used individually or in combination, such as magnetic detectors, optical detectors, and radio frequency detectors. The navigation system 920 may control and monitor the motion and direction of the vehicle's 900 steerable propulsion wheels 104, 106. In this way, the vehicle 900 can be made to proceed along one of a plurality of courses, which may be predetermined, without a need of tracks or embedded wires for navigation, communication, or power. In one embodiment, a comparison of a predicted location versus an actual location, which might be determined for example based on measurements made by determinations of distances from various fixed known locations, allows the navigation system to perform real-time course monitoring, to determine if a navigation error has occurred during a show.

Other types of navigation systems 900 are within the scope of the invention. For example, given sufficient precision of its steering and propulsion systems, the vehicle 900 might not require real time course monitoring. Additionally or alternatively, the vehicle might use an inertial navigation system, or the like as a navigation system.

The disclosed invention lends itself to the establishment of a system comprising a plurality of uniquely addressed vehicles 900, 950, 960, 970 (where 950, 960, 970 are similar to 900). Each of the plurality of vehicles 900, 950, 960, 970 may be individually controlled by at least one on-board processor (similar to 901), where each of the plurality of on-board processors is in wireless communication with at least one ride system controlled 924, which is remote from the vehicles and utilizes its own processor(s) 926. The ride system controller 924 may maintain situational and positional awareness of the plurality of vehicles, and exercise emergency control of one, all, or any subset of the plurality of vehicles 900, 950, 960, 970 by wireless communication. 24

In a ride environment, where a plurality of vehicles 900, 950, 960, 970 are traversing the environment simultaneously, the pitch and roll movements of the passenger platforms of each uniquely addressed vehicle may be synchronized to the position of the vehicle along the preprogrammed route by distance and/or time. The vehicle, system, and method of operation of the vehicle and system find utility in the amusement park ride industry, but the invention is not limited thereto. The description provided herein utilizes the amusement park ride industry for exemplary purposes only, to describe embodiments of the invention; however, the invention is not limited to the amusement park ride industry and can find utility in any number of other industries.

In accordance with a method of the invention, a vehicle 900 will come to a stop according to a command from the vehicle's own processor 901 if a condition such as a system failure or safety violation occurs on the vehicle 900. If this condition exists, the vehicle can notify a ride system controller 924 of its situation via the communication interface 904 and wireless transmission via antenna 906 or infrared device 908. The ride system controller 924 can determine if other vehicles should be stopped to avoid collision, for example. The ride system controller, using the unique addresses of each vehicle, may command a single vehicle 950 to stop, if only the single vehicle was in danger of collision. Alternatively, the ride system controller, using the unique addresses of each vehicle, may command a subset of the vehicles 950,960 to stop, if only that subset of vehicles was in danger of collision. Alternatively, the ride system controller, using the unique addresses of each vehicle, may command all vehicles 950, 960,970 to stop. Any vehicle 900, 950, 960, 970, upon receipt of a command uniquely addressed to it, can come to a controlled stop.

The disclosed invention has been described above in terms of one or more preferred embodiments and one or more alternate embodiments. Moreover, various aspects of the disclosed invention have been described. One of ordinary skill in the art should not interpret the various aspects or embodiments as limiting in any way, but as exemplary. Clearly, other embodiments are within the scope of the disclosed invention. The scope the disclosed invention will instead be determined by the appended claims.

What is claimed is:

1. A multiple degrees of freedom motion base assembly, the degrees of freedom comprising pitch and roll, the motion base assembly comprising:
   a. a lower reaction plate defining a first horizontal plane, the lower reaction plate comprising:
      i. a first outer boundary; and
      ii. a center;
   b. an upper reaction plate spaced apart from the lower reaction plate, the upper reaction plate defining a second horzintonal plane and comprising:
      i. a second outer boundary;
      ii. a center; and
      iii. a longitudinal axis defined between each of two opposing ends of the second horizontal plane; and
   c. a pivotable coupling, comprising:
      i. an upper section coupled to the upper reaction plate proximate the upper reaction plate center, the upper section configured to allow substantially similar displacement of the upper reaction plate about the upper reaction plate center at either end of the two ends of the second horizontal plane; and
      ii. a lower section pivotably connected to the upper section and coupled to the lower reaction plate proximate the lower reaction plate center;
   d. two linear actuator assemblies spaced apart from each other on opposite sides of the pivotable coupling with respect to the upper reaction plate longitudinal axis and from the pivotable coupling, each linear actuator assembly comprising:
      i. an actuator coupling connected to the upper reaction plate intermediate the second outer boundary and the pivotable coupling;
      ii. a connector connected to the lower reaction plate intermediate the first outer boundary and the pivotable coupling; and
      iii. an electric linear actuator constrained to be extendable and retractable along a longitudinal axis of the electric linear actuator, the electric linear actuator comprising:
         1. a selectively, forcibly extendable and retractable shaft defining the longitudinal axis of the electric linear actuator;
         2. an electric actuator operatively coupled to the selectively, forcibly extendable and retractable shaft;
         3. an upper portion coupled to the actuator coupling; and
         4. a lower portion connected to the clevis assembly; and
   e. an electrical power supply operatively in communication with the two electric linear actuators as a sole source of operating energy for the two electric linear actuators.

2. The multiple degrees of freedom motion assembly of claim 1, wherein the upper portion of at least one linear electric actuator extends at least partially through the upper reaction plate.

3. The multiple degrees of freedom motion assembly of claim 1, wherein the pivotable coupling comprises a fixed length.

4. The multiple degrees of freedom motion assembly of claim 1, wherein the electrical power supply comprises a rechargeable battery operatively in communication with the two electric linear actuator assemblies as a sole source of operating energy for the two electric linear actuators.

5. The multiple degrees of freedom motion assembly of claim 1, wherein the actuator coupling comprises a gimbal.

6. The multiple degrees of freedom motion assembly of claim 1, wherein the connector comprises a clevis assembly.

7. A multiple degrees of freedom motion assembly, comprising:
   a. a lower reaction plate, comprising:
      i. a first outer boundary; and
      ii. a center;

b. an upper reaction plate spaced apart from the lower reaction plate, the upper reaction plate defining a horzintonal plane and comprising:
   i. a second outer boundary;
   ii. a center; and
   iii. a longitudinal axis defined between each of two opposing ends of the horizontal plane;
c. a pivotable coupling, comprising:
   i. an upper section coupled to the upper reaction plate proximate the upper reaction plate center, the upper section configured to allow substantially similar displacement of the upper reaction plate about the upper reaction plate center at either end of the two ends of the second horizontal plane; and
   ii. a lower section pivotably connected to the upper section and coupled to the lower reaction plate proximate the lower reaction plate center;
d. two linear actuator assemblies spaced apart from each other on opposite sides of the pivoatble coupling with respect to the horizontal plane along the upper reaction plate longitudinal axis and from the pivotable coupling, each linear actuator assembly comprising:
   i. an actuator coupling connected to the upper reaction plate intermediate the second outer boundary and the pivotable coupling;
   ii. a connector connected to the lower reaction plate intermediate the first outer boundary and the pivotable coupling; and
   iii. a linear actuator comprising:
      1. an upper portion coupled to the actuator coupling extending at least partially through the upper reaction plate;
      2. a lower portion connected to the clevis assembly; and
      3. a transport assembly, comprising a chassis connected to the lower reaction plate.

8. The multiple degrees of freedom motion assembly of claim 7, wherein the linear actuator comprises an electric linear actuator, a screw actuator, or a hydraulic actuator.

9. A multiple degrees of freedom motion assembly of claim 7, wherein the connector comprises a clevis assembly.

10. A vehicle, comprising:
a. a chassis;
b. a first actively steerable propulsion wheel coupled to the chassis, the first actively steerable propulsion wheel rotatable in a first predetermined direction at a first predetermined speed along a preprogrammed route without the use of a mechanical track or a wire stretched along the preprogrammed route;
c. a second actively steerable propulsion wheel coupled to the chassis, the second actively steerable propulsion wheel rotatable in a second predetermined direction at a second predetermined speed along the preprogrammed route without the use of a mechanical track or a wire stretched along the preprogrammed route; and
d. a multiple degree of freedom motion base assembly, comprising:
   i. a lower reaction plate coupled to the chassis, the lower reaction plate defining a first horizontal plane, the lower reaction plate comprising:
      1. a first outer boundary; and
      2. a center;
   ii. an upper reaction plate spaced apart from the lower reaction plate and connected to the chassis, the upper reaction plate defining a second horzintonal plane and comprising:
      1. a second outer boundary;
      2. a center; and
      3. a longitudinal axis defined between each of two opposing ends of the second horizontal plane; and
   iii. a pivotable coupling, comprising:
      1. an upper section fixed to the upper reaction plate proximate the upper reaction plate center, the upper section configured to allow substantially similar displacement of the upper reaction plate about the upper reaction plate center at either end of the two ends of the second horizontal plane; and
      2. a lower section pivotably connected to the upper section and fixed to the lower reaction plate proximate the lower reaction plate center;
   iv. two linear actuator assemblies spaced apart from each other on opposite sides of the pivotable coupling with respect to the second horizontal plane along the upper reaction plate longitudinal axis and from the pivotable coupling, each linear actuator assembly comprising:
      1. an actuator coupling connected to the upper reaction plate intermediate the second outer boundary and the pivotable coupling;
      2. a connector connected to the lower reaction plate intermediate the first outer boundary and the pivotable coupling; and
      3. an electric linear actuator constrained to extend and retract along a longitudinal axis of the electric linear actuator, the electric linear actuator comprising:
         a. an upper portion coupled to the actuator coupling; and
         b. a lower portion connected to the clevis assembly; and
   v. an electrical power supply operatively in communication with the two electric linear actuator assemblies as a sole source of operating energy for the two electric linear actuators.

11. The vehicle of claim 10, wherein the upper portion of at least one linear electric actuator extends at least partially through the upper reaction plate.

12. The vehicle of claim 10, wherein:
a. the vehicle comprises a predetermined set of other electrical components; and
b. the electrical power supply comprises a rechargeable battery operatively in communication with the two electric linear actuator assemblies and the other electrical components of the vehicle as their sole source of operating energy.

13. The vehicle of claim 10, wherein the vehicle further comprises:
a. a wireless communication interface; and
b. a controller operatively in communication with the wireless communication interface and operative to execute a command received through the wireless communication interface if the command is addressed to a unique address of the vehicle.

14. The vehicle of claim 10, further comprising:
a. a passenger platform fixed to the upper reaction plate;
b. a predetermined set of rows of seats fixed to the passenger platform.

15. The vehicle of claim 10, further comprising:
a. a slew bearing, comprising:
   i. a first portion fixed to the chassis; and
   ii. a second portion operatively connected to a predetermined one of the upper reaction plate or lower reaction plate, the slew bearing rotatable with respect to the chassis and operative to provide substantially continuous, selectively controlled rotation in a predetermined direction to a predetermined azimuth position at a predetermined rotational speed;

b. a slew bearing pinion motor comprising a shaft, the slew bearing pinion motor connected to the chassis; and c. a slew bearing pinion fixed to the shaft, the slew bearing pinion operatively in communication with slew bearing gear and rotatable at a commanded slew speed and direction.

16. The vehicle of claim 15, wherein the predetermined direction selectively comprises both a clockwise direction and a counterclockwise direction.

17. The vehicle of claim 15, wherein:

a. the pivotable coupling comprises a vertically oriented pivotable coupling; and b. the central axis of the vertically oriented pivotable coupling passes through a point at a geometric center of the slew bearing.

18. The vehicle of claim 17, wherein:

a. the vehicle further comprises:

i. a passenger platform fixed to the upper reaction plate; and ii. two rows of seats connected to the passenger platform; and b. the vertically oriented pivotable coupling comprises a central axis which passes through a point at a geometric center of the slew bearing and through a point on the passenger platform that is between a first row of the two rows of seats and a second row of the two rows of seats.

19. The multiple degrees of freedom motion assembly of claim 10, wherein the connector comprises a clevis assembly.

\* \* \* \* \*